(No Model.)

A. CAMERON.
SCREW TAP.

No. 471,948. Patented Mar. 29, 1892.

Witnesses,
Robert Everett.
Dennis Sumby.

Inventor:
Angus Cameron.
By James L. Norris.
Atty.

UNITED STATES PATENT OFFICE.

ANGUS CAMERON, OF CHICAGO, ILLINOIS, ASSIGNOR TO THE CAPITOL MANUFACTURING COMPANY, OF SAME PLACE.

SCREW-TAP.

SPECIFICATION forming part of Letters Patent No. 471,948, dated March 29, 1892.

Application filed December 16, 1891. Serial No. 415,274. (No model.)

*To all whom it may concern:*

Be it known that I, ANGUS CAMERON, a subject of the Queen of Great Britain, residing at Chicago, in the county of Cook and State of Illinois, have invented new and useful Improvements in Screw-Taps, of which the following is a specification.

This invention relates to taps or reamers for screw-threading nut-blanks or other articles or objects where a female thread is to be produced.

The objects of my invention are to strengthen the tap or reamer, to clear chips from the nut or other blank and prevent them accumulating and wedging between the tap or reamer and the object being tapped, to size the threads of the nut or other article after it is tapped, and to enable the chips being washed away without passing along the shank of the tap or reamer.

To such ends the invention consists, essentially, in a screw-tap having a complete screw-thread separated from the inner end of the fluted sectionally-threaded portion through the medium of an intervening annular space or groove.

The invention is illustrated by the accompanying drawings, in which—

Figure 1:
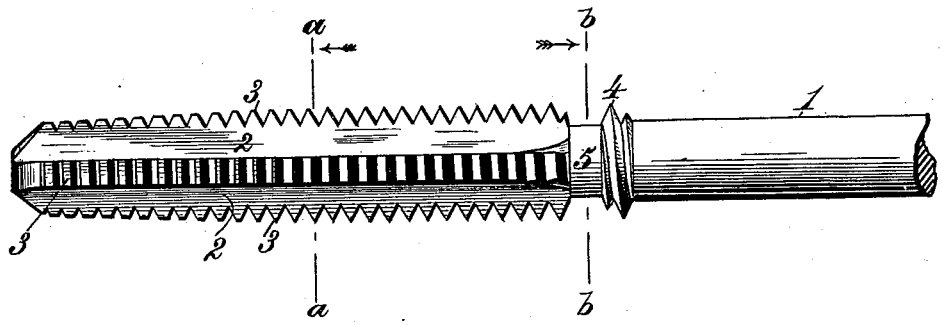
Figure 2:
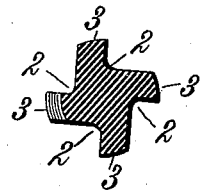
Figure 3:
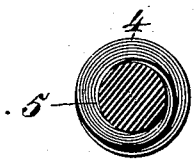

Figure 1 is a side elevation of a tap or reamer constructed in accordance with my invention. Fig. 2 is a transverse sectional view taken on the line $a\ a$, Fig. 1; and Fig. 3 is a similar view taken on the line $b\ b$, Fig. 1.

In order to enable those skilled in the art to make and use my invention, I will now describe the same in detail, referring to the drawings, wherein—

The numeral 1 indicates the cylindrical shank of the tap or reamer, which is properly formed to be engaged with and held by a holder of any construction suitable for the conditions required. The tap is formed at one end with longitudinal flutes 2 and sections 3 of a screw-thread, as usual in taps or reamers for producing female screw-threads in nut-blanks or other articles or objects. In juxtaposition to the inner end of the fluted sectionally-threaded portion is formed a complete screw-thread 4, one or more, which, as here shown, is separated from the sectionally-threaded portion through the medium of an annular space or groove 5 of a width less than the thickness of the nut or other article which is to be tapped. The object of the complete screw thread or threads is to clear the chips out of the nut or other object passing over the tap or through which the tap passes. The complete screw-thread also materially strengthens the tap, while the annular space or groove 5 effectually avoids the accumulation of chips, as they can be readily washed away without passing along the shank of the tap or reamer. The annular space or groove 5 should be of a width less than the thickness of the nut or object to be tapped. The complete screw thread or threads not only clears the chips out of the nut or other object, but also operates to size the screw-thread in the nut or other object after the latter has been tapped.

The annular space or groove 5 is important and essential, in that it effectually prevents the chips from accumulating and wedging between the tap and the nut or other object, which accumulation would cause breakage of the tap and produce undue strain on the tap-machine.

Having thus described my invention, what I claim is—

A screw-tap having a complete screw-thread separated from the inner end of the fluted sectionally-threaded portion through the medium of an intervening annular space or groove, substantially as described.

In testimony whereof I have hereunto set my hand and affixed my seal in presence of two subscribing witnesses.

ANGUS CAMERON. [L. S.]

Witnesses:
 THOS. B. BROWN,
 LOUIS SCHLESING.